United States Patent [19]

Rumbaugh

[11] Patent Number: 5,411,235
[45] Date of Patent: May 2, 1995

[54] FIXTURE FOR ANGULARLY ALIGNING AN OPTICAL DEVICE

[75] Inventor: Scott H. Rumbaugh, Lake Oswego, Oreg.

[73] Assignee: Apeldyn Corporation, Portland, Oreg.

[21] Appl. No.: 40,758

[22] Filed: Mar. 31, 1993

[51] Int. Cl.⁶ .............................................. A47G 29/00
[52] U.S. Cl. .................................... 248/371; 248/140; 356/138; 385/78
[58] Field of Search ............ 248/371, 396, 397, 372.1, 248/160, 133, 138, 139, 137, 141, 142; 108/2, 3, 7; 356/138; 385/33, 74, 78

[56] References Cited

U.S. PATENT DOCUMENTS

| | | | |
|---|---|---|---|
| 144,441 | 11/1873 | Cartwright | 248/371 |
| 149,255 | 3/1874 | Semmendinger | 108/7 |
| 317,230 | 5/1885 | Smith | 248/371 |
| 1,102,972 | 7/1914 | Woodworth | 248/140 |
| 1,214,413 | 1/1917 | Bell | 248/142 |
| 1,595,329 | 8/1926 | Wheatley | 248/140 |
| 1,777,288 | 10/1930 | Bateman et al. | 248/140 |
| 3,577,936 | 5/1971 | Emery | 248/396 X |
| 4,069,995 | 1/1978 | Miller | 248/160 X |
| 4,215,937 | 8/1980 | Borsuk | 385/74 X |
| 4,650,277 | 3/1987 | Husher et al. | 385/33 X |
| 4,749,250 | 6/1988 | Carter | 385/33 |
| 4,787,698 | 11/1988 | Lyons et al. | 385/78 |
| 4,929,045 | 5/1990 | Fuller | 385/33 |
| 4,989,940 | 2/1991 | Wollenweber et al. | 385/74 X |

*Primary Examiner*—Ramon O. Ramirez
*Assistant Examiner*—Korie H. Chan
*Attorney, Agent, or Firm*—William A. Birdwell & Associates

[57] ABSTRACT

A fixture for angularly aligning an optical device. A monolithic structure is provided having a first adjustment member for holding an optical device and tilting the device in one direction, a second adjustment member attached to the first adjustment member for tilting the optical device in a direction orthogonal to the direction of tilt provided by the first adjustment member, and a base for holding the first and second adjustment members. The first adjustment member is attached to the second adjustment member by a flexible connection having a tilt axis in a first lateral direction and the second adjustment member is attached to the base by a connection having a tilt axis in a lateral direction orthogonal to the lateral direction of the first connection. Tilting of the first adjustment member with respect to the second adjustment member is accomplished by squeezing the first adjustment member toward the second adjustment member near the edges thereof or by pulling the first adjustment member away from the second adjustment member near the edges thereof. Tilting of the second adjustment member with respect to the base is accomplished in a similar manner. Preferably, the first and second adjustment members and the base are formed by cutting lateral slots partially through a cylindrical, monolithic member, the remaining portion of the monolithic member forming the flexible connection.

8 Claims, 3 Drawing Sheets

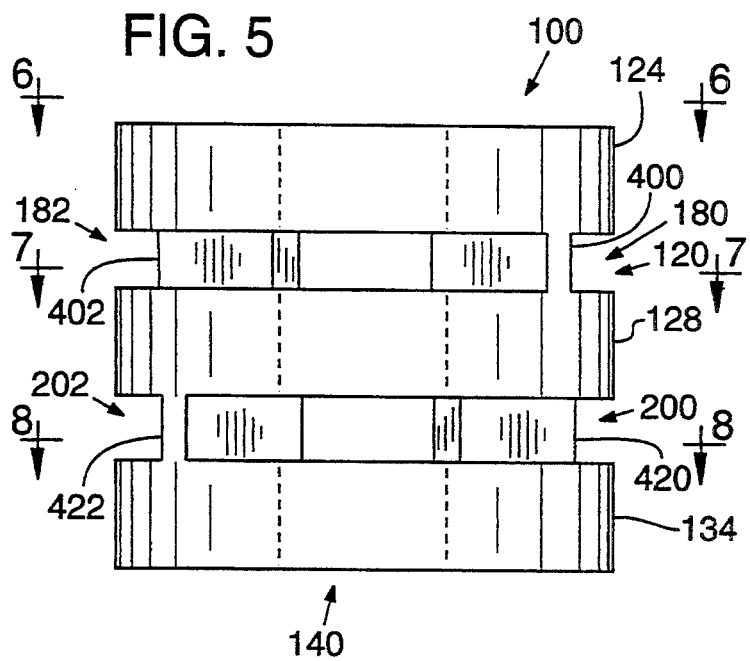
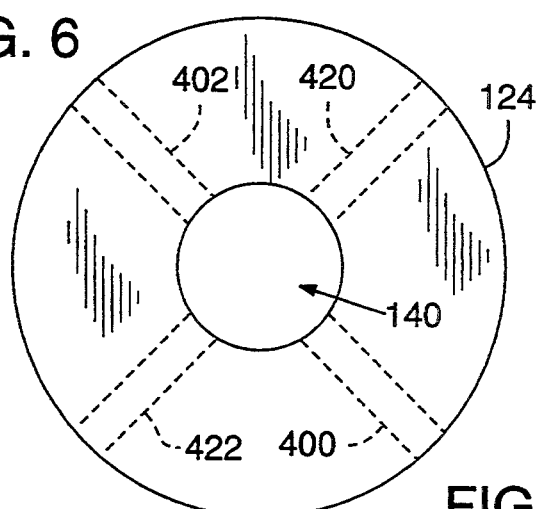
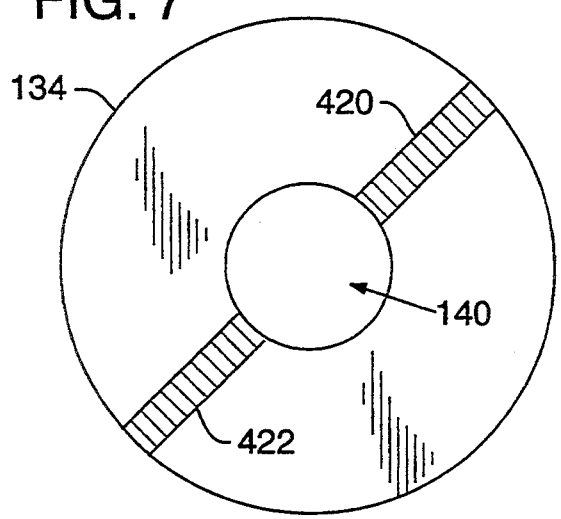
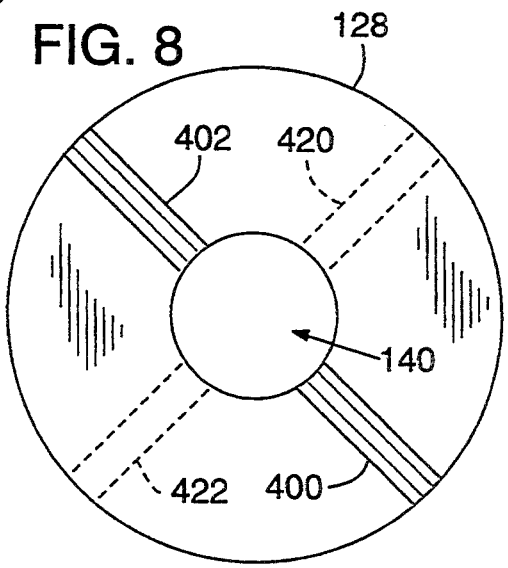

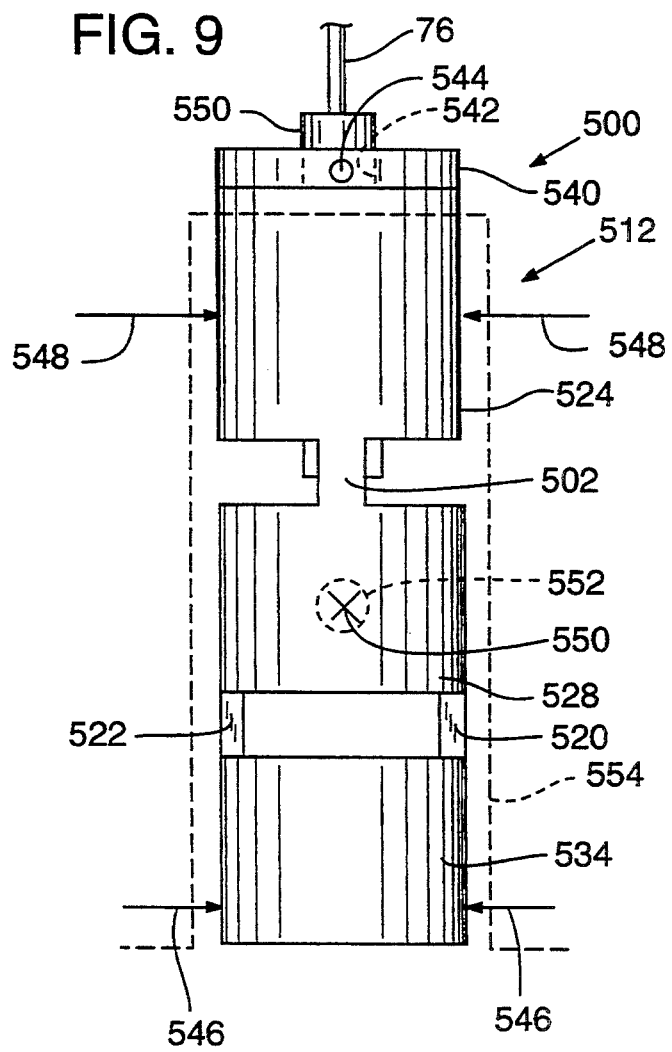

FIXTURE FOR ANGULARLY ALIGNING AN OPTICAL DEVICE

BACKGROUND OF THE INVENTION

This invention relates to optical devices, particularly to fixtures for angularly aligning an optical device.

It is often necessary to align the optical axis of an optical device angularly with respect to a reference. This may be done to ensure maximum coupling of optical power between optical devices or to minimize back reflection of light in to the fiber. An example of such an optical device is a fiber-optic collimator, which is comprised of an optical fiber and a lens disposed with respect to the end of the fiber such that the light emitted by the optical fiber is collimated.

Prior devices known to be used for angularly aligning one optical device with respect to another optical device employ multi-part, sometimes mechanically intricate, optical device mounting arrangements, or parts separated by partially compressed elastomeric material in the shape of a torroid whose compression is adjustable at three points around the periphery thereof. The known multiple-part and mechanically intricate devices require relatively involved fabrication for the straightforward function they are to perform, and are not adopted for use with fiber-optic terminations such as a collimator. The elastomeric devices are difficult to use, have poor repeatability characteristics and are subject to deterioration with time due to changes in the characteristics of the elastomer.

Accordingly, there is a need for an improved fixture for angularly aligning one optical device with respect to another optical device.

SUMMARY OF THE INVENTION

The present invention fulfills the aforementioned need by providing a structure having a first adjustment member for holding the an optical device and tilting the device about a first axis, a second adjustment member for tilting the optical device about a second axis which is orthogonal to the tilt provided by the first adjustment member, and a base for holding the first and second adjustment members. The first adjustment member is attached to the second adjustment member by a flexible connection having a tilt axis in a first lateral direction, and the second adjustment member is attached to the base by a flexible connection having a tilt axis in a lateral direction orthogonal to the lateral direction of the first connection. Tilting of the first adjustment member with respect to the second adjustment member is accomplished by squeezing the first adjustment member toward the second adjustment member near the edges thereof or by pushing the first adjustment member away from the second adjustment member near the edges thereof. Tilting of the second adjustment member with respect to the base is accomplished in a similar manner.

Preferably, the first and second adjustment members and the base are formed by cutting lateral slots partially through a cylindrical, monolithic member, the remaining portion of the monolithic member forming the flexible connection. Preferably, the flexible connection is disposed toward the outer edge of the monolithic member, though it may also be disposed at the center thereof. The adjustment members may be tilted either by the use of threaded fasteners used to draw the adjustment members together or force them apart, or by the application of lateral force.

Accordingly, it is a principle of object of the present invention to provide a novel and improved fixture for angularly aligning an optical device.

It is another object of the present invention to provide an angular alignment fixture which is compact and simple to use.

It is a further object of the present invention to provide an angular alignment fixture that is easy to manufacture.

It is yet another object of the present invention to provide an angular alignment fixture which is stable.

It is yet a further object of the present invention to provide an angular alignment fixture which provides angular adjustment in orthogonal directions.

The foregoing and other objects, features and advantages of the invention will be more readily understood upon consideration of the following detailed description of the invention, taken in conjunction with the accompanying drawings.

BRIEF DESCRIPTION OF THE DRAWINGS

FIG. 5 is a side view of a first alternative embodiment of a fixture for angularly aligning an optical device according to the present invention.

FIG. 6 is an end view of the fixture of FIG. 5, taken along line 6—6 thereof.

FIG. 7 is a cross-section of the fixture of FIG. 5, taken along line 7—7 thereof.

FIG. 8 is a cross-section of the fixture of FIG. 5, taken along line 8—8 thereof.

FIG. 9 is a side view of a second alternative embodiment of a fixture for angularly aligning an optical device according to the present invention.

DESCRIPTION OF THE PREFERRED EMBODIMENT

Figure 1:
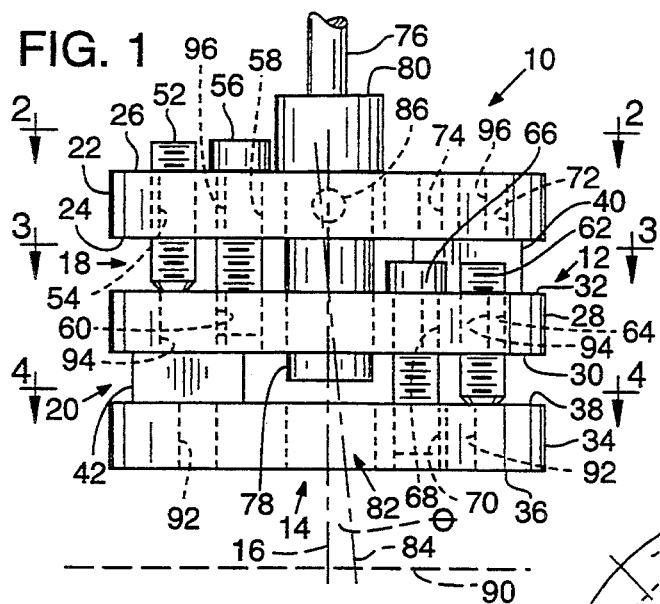
FIG. 1 is a side view of a preferred embodiment of a fixture for angularly aligning an optical device according to the present invention, with a fiber-optic collimator disposed therein.

Referring to FIG. 1, a preferred embodiment 10 of a fixture according to the present invention comprises a monolithic member 12, preferably cylindrical in shape, having an aperture 14 therethrough generally disposed along a reference axis 16, and a first slot 18 and a second slot 20 formed partially therethrough and generally disposed perpendicular to the reference axis 16. By virtue of the slots 18 and 20 the monolithic member is partitioned into a first adjustment member 22, having a front face 24 and a back face 26, a second adjustment member 28, having a front face 30 and a back face 32, and a base member 34, having a front face 36 and a back face 38. The first adjustment member 22 is connected to the second adjustment member 28 by a flexible connection 40, and the second adjustment member 28 is connected to the base member 34 by a flexible connection 42.

Figure 2:
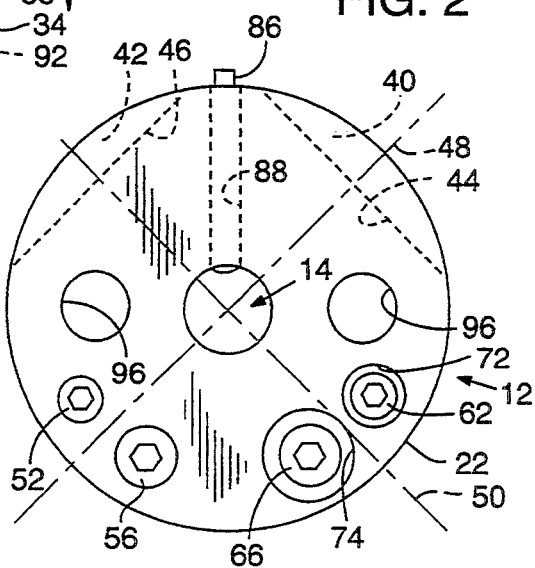
FIG. 2 is an end view of the fixture of FIG. 1, taken along line 2—2 thereof.
Figure 3:
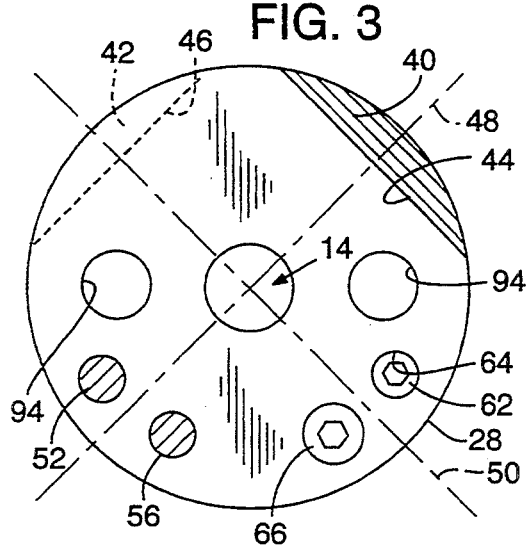
FIG. 3 is a cross section of the fixture of FIG. 1, taken along line 3—3 thereof.
Figure 4:
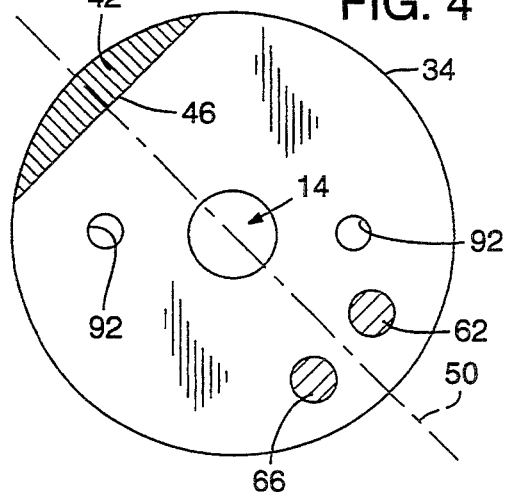
FIG. 4 is a cross section of the fixture of FIG. 1, taken along line 4—4 thereof.

Turning now to FIGS. 2 through 4 as well as FIG. 1, connection 40 comprises a portion of the monolithic member 12 which corresponds in position to first slot 18 and connection 42 comprises a portion of the monolithic member 12 which corresponds in position to second slot 20. Connection 40 has an interior straight edge 44 parallel to which connection 40 flexes, and connection 42 has an interior straight edge 46 parallel to which connection 42 flexes. Straight edge 46 is antiparallel, preferably perpendicular, to straight edge 44 so that, flexing connection 40 and connection 42, adjustments in two orthogonal directions, represented by lines 48 and 50, respectively, can be achieved.

The tilt of the first adjustment member 22 with respect to the second adjustment member 28 is adjusted by rotating a set screw 52 disposed in a threaded aperture 54 through first adjustment member 22, and by rotating threaded fastener 56 which extends through an aperture 58 in adjustment member 22 and into a threaded aperture 60 in adjustment member 28. By advancing the set screw 52, adjustment member 22 is tilted away from adjustment member 28 along line 48. By advancing threaded fastener 56, the adjustment member 22 is tilted toward the adjustment member 28 until the set screw 52 abuts against the adjustment member 28, at which point the position of adjustment member 22 becomes fixed. Preferably, set screw 52 has a female allen receptacle, and threaded fastener 56 has a bolt head with a female allen receptacle, though other types of threaded fasteners may be used without departing from the principles of the invention. Preferably, the first adjustment member 22 is initially pulled away from the second adjustment member 28 so as to bend the connection 40 and thereby bias the first adjustment member 22 so as to be tilted away from the second adjustment member 28 in the absence of force squeezing the two adjustment members together. When this is done, the entire tilt adjustment can be accomplished by rotating threaded fastener 56, the set screw 52 serving merely to fix the position once it is set.

Similarly, the position of adjustment member 28 is adjusted with respect to base 34 by rotating set screw 62, which is disposed in threaded aperture 64 and by rotating threaded fastener 66, which is disposed through aperture 68 in adjustment member 28 and in threaded aperture 70 of base 34. Advancing set screw 62 tilts adjustment member 28 away from base 34. Advancing threaded fastener 66 tilts adjustment member 28 toward the base 34. Preferably, set screw 62 and threaded fastener 66 are the same type of threaded fasteners as set screw 52 and threaded fastener 56, respectively. Access to set screw 62 is obtained through aperture 72 in adjustment member 22 and access to threaded fastener 66 is obtained through aperture 74 in adjustment member 22, these two apertures enabling access by allen wrenches.

Returning particularly to FIG. 1, an optical device is typically mounted in a cylindrical housing 78 having a collar 80 at the back end of the housing. The housing typically contains a lens, the light from the optical fiber 76 emanating from the front end 82 of the housing 78. A collimator is an example of such a device. The optical axis of the light emanating from the front end 82 of the housing is represented by line 84. The housing is fixed within aperture 14 in adjustment member 22 by a set screw 86 disposed in threaded aperture 88, which runs laterally from the side of adjustment member 22 to aperture 14 therein. Preferably, set screw 86 has a female allen receptacle, though other types of threaded fasteners may be employed without departing from the principles of the invention.

Thence, by tilting adjustment member 22 with respect to adjustment member 28, and tilting adjustment member 28 with respect to base 34, the angle $\Theta$ between the optical axis 84 and reference axis 16 may be selectively adjusted in any radial direction from the reference axis 16. This enables the optical axis 84 to be aligned with respect to a reference, such as reference plane 90. Once the optical axis 84 is aligned, using set screw 52, threaded fastener 56, set screw 62 and threaded fastener 66, the position of the end of the optical device is fixed.

The alignment fixture 10 may be mounted by placing bolts or other threaded fasteners through apertures 92 in base 34, as shown in FIG. 4. Apertures 94 are provided in the second adjustment member 28 and corresponding apertures 96 are provided in the first adjustment member 22 for access to apertures 92 in base 34. Alternatively, the fixture may be mounted by a clamp or screws fastened to the side of the base 34 or by screws from the front surface of base 34.

An alternative embodiment 100 of the alignment fixture is shown in FIGS. 5 through 8. It comprises a monolithic element 120 having a first adjustment means 124, a second adjustment means 128 and a base 134. Slots 180 and 182 are formed between adjustment members 124 and 128, leaving connecting members 400 and 402 between those two adjustment members. Slots 200 and 202 are formed between adjustment members 128 and base 134, leaving connecting members 420 and 422 therebetween. An aperture 140 is disposed through the center of the monolithic member 120 for receiving an optical device, e.g., an optical device housing 78, as shown in FIG. 1. Set screws and threaded fasteners may be provided like those shown in FIG. 1 to tilt adjustment member 124 with respect to adjustment member 128, and to tilt adjustment member 128 with respect to base 134.

The difference between the embodiment shown in FIG. 5 and the embodiment shown in FIG. 1 is that in the embodiment of FIG. 5 the connections between the adjustment members are centered on the axis of the monolithic element 120, rather than being off-set toward the edge thereof as in the embodiment of FIG. 1. While the embodiment in FIG. 1 provides a larger lever arm between the adjustment screws and fasteners and the pivot point provided by the flexible connection, thereby providing higher alignment resolution than the embodiment shown in FIG. 5, the embodiment shown in FIG. 5 is less susceptible to longitudinal movement than the embodiment shown in FIG. 1.

It is preferred, in both embodiments, that the respective set screw and threaded fastener for a given adjustment member be disposed on opposite sides of the respective adjustment line 48 or 50. This reduces tilt in other than the direction of the respective adjustment line 48 or 50.

A third embodiment 500 of the alignment means is shown in FIG. 9. It comprises a monolithic element 512, a first adjustment member 524, a second adjustment member 528 and a base 534. Adjustment member 524 is connected to adjustment member 528 by a connection having a first part 502 and a second part 504 (behind part 502 in FIG. 9 and not shown) and adjustment member 528 is connected to base 534 by a connection having two-parts 520 and 522. This embodiment is formed by cutting slots in the side of a tube having relatively thin walls. A cap 540 is attached at the top of the tube, and includes an aperture 542 therethrough for receiving an optical device 550 and a set screw 544 in the cap 540 for fixing the device in the cap.

The monolithic element 512 is held at its base 534, preferably by lateral force from a clamp, bolts or the like, as represented by arrow 546. The first adjustment member 524 is tilted back and forth by lateral force applied by set screws or the like, as represented by arrows 548. The second adjustment member 528 is tilted back and forth by lateral force applied, for example, by set screws as represented by "X" 550 and "0" 552. Any convenient housing 554 may be provided for mounting set screws or other force applying means.

The monolithic elements 12, 120 and 512 may be made of any suitable material, though it has been found that 770 aluminum has been found to be particularly suitable in the preferred embodiment.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A fixture for angularly aligning an optical device, comprising:
    a monolithic member having a longitudinal axis and a first lateral slot therein extending into and across said monolithic member so as to separate said monolithic member into a first portion and a second portion, said first lateral slot extending only partially into said monolithic member so that part of said monolithic member forms a first connection between said first portion and said second portion;
    holder means for attaching said optical device to said first portion; and
    first tilt adjuster, connected to said monolithic element, for tilting said first portion of said monolithic element with respect to said second portion of said monolithic element by flexing said first connection therebetween.

2. The fixture of claim 1, wherein said monolithic member further has a second lateral slot therein extending into and across said monolithic member so as to separate said second portion of said monolithic member from a third portion of said monolithic member, said second lateral slot extending only partially into said monolithic member so that part of said monolithic member forms a second connection between said second portion and said third portion, said first slot terminating within said monolithic member along a first tilt axis, said second slot terminating within said monolithic member along a second tilt axis, said second tilt axis not being parallel to said first tilt axis, said fixture further comprising second tilt adjuster, connected to said monolithic element, for tilting said second portion of said monolithic element with respect to said third portion of said monolithic element.

3. The fixture of claim 2, wherein said second tilt axis is orthogonal to said first tilt axis.

4. The fixture of claim 1, wherein said monolithic member has an aperture formed therein along said longitudinal axis for receiving said optical device and means for fastening said optical device therein.

5. The fixture of claim 1, wherein said first portion of said monolithic element includes a threaded aperture therethrough substantially parallel to said longitudinal axis of said monolithic element, and said first tilt adjuster comprises a set screw disposed within said threaded aperture so as to push against said second portion of said monolithic element.

6. The fixture of claim 1, wherein said first portion of said monolithic element includes an aperture therethrough and said second portion of said monolithic element includes a threaded aperture therein, said first tilt adjuster comprising a threaded fastener having a head at one end, said threaded fastener extending away from said head and through said aperture in said first portion and into said threaded aperture in said second portion.

7. A fixture for angularly aligning of an optical device, comprising:
    a fiber optics device holder having a longitudinal axis and an aperture through said holder generally along said longitudinal axis;
    first tilt adjuster, connected to said holder, for tilting said optical device about a first lateral axis substantially perpendicular to said longitudinal axis; and
    second tilt adjuster, connected to said holder, for tilting said optical device about a second lateral axis substantially perpendicular to said longitudinal axis, said lateral second axis not being parallel to said first lateral axis.

8. A method for adjusting the tilt of a fixture for angularly aligning an optical device wherein the fixture comprises a monolithic member having a longitudinal axis and a lateral slot therein extending into and across said monolithic member so as to separate said monolithic member into a first portion and a second portion, said lateral slot extending only partially into said monolithic member so that part of said monolithic member forms a connection between said first portion and said second portion, and a holder for attaching said optical device to said first portion of said monolithic member, said method comprising:
    preloading said monolithic member so as to bias said first portion at a tilted position with respect to said second portion; and
    applying a selected amount of force to said first portion to tilt said first portion toward said second portion so as to angularly align said optical device.

* * * * *